(12) United States Patent
Gabriel

(10) Patent No.: US 8,912,436 B2
(45) Date of Patent: Dec. 16, 2014

(54) METHOD TO REDUCE SIGNAL DISTORTION CAUSED BY DIELECTRIC MATERIALS IN TRANSMISSION WIRES AND CABLES

(75) Inventor: Caelin Gabriel, Poulsbo, WA (US)

(73) Assignee: Gabriel Patent Technologies, LLC, Poulsbo, WA (US)

( * ) Notice: Subject to any disclaimer, the term of this patent is extended or adjusted under 35 U.S.C. 154(b) by 494 days.

(21) Appl. No.: 13/251,045

(22) Filed: Sep. 30, 2011

(65) Prior Publication Data

US 2012/0080212 A1 Apr. 5, 2012

Related U.S. Application Data

(60) Provisional application No. 61/388,539, filed on Sep. 30, 2010.

(51) Int. Cl.
*H01B 11/02* (2006.01)
*H04B 3/00* (2006.01)

(52) U.S. Cl.
CPC ........................................ *H04B 3/00* (2013.01)
USPC .............................................. 174/34; 174/36

(58) Field of Classification Search
USPC .............. 174/36, 28, 27, 102 R, 34, 74 R, 78, 174/84 R, 88 C
See application file for complete search history.

(56) References Cited

U.S. PATENT DOCUMENTS

| | | | |
|---|---|---|---|
| 3,275,839 A * | 9/1966 | Bartik | 307/403 |
| 3,324,417 A * | 6/1967 | Garner | 333/1 |
| 3,626,287 A * | 12/1971 | Di Niro | 324/688 |
| 3,739,188 A * | 6/1973 | Froehling | 307/103 |
| 4,028,660 A * | 6/1977 | Pitts, Jr. | 340/854.9 |
| 4,156,869 A * | 5/1979 | Schukantz | 174/108 |
| 4,204,129 A * | 5/1980 | Hutchins, Jr. | 307/147 |
| 4,216,449 A * | 8/1980 | Kach | 333/236 |
| 4,335,412 A * | 6/1982 | Aschwanden | 361/50 |
| 4,510,468 A * | 4/1985 | Mayer | 333/12 |
| 4,599,483 A * | 7/1986 | Kuhn et al. | 174/36 |
| 4,627,076 A * | 12/1986 | Staal et al. | 375/257 |
| 4,754,102 A * | 6/1988 | Dzurak | 174/36 |
| 4,874,908 A * | 10/1989 | Johansson | 174/72 A |
| 5,150,442 A * | 9/1992 | Desmons | 385/101 |
| 5,266,744 A * | 11/1993 | Fitzmaurice | 174/103 |
| 5,307,416 A * | 4/1994 | Martin | 381/77 |
| 5,548,082 A * | 8/1996 | Palmer | 174/34 |
| 5,677,959 A * | 10/1997 | Silfvast | 381/77 |
| 5,929,374 A * | 7/1999 | Garland | 174/28 |
| 6,310,286 B1 * | 10/2001 | Troxel et al. | 174/36 |
| 6,395,977 B1 * | 5/2002 | Yamamoto | 174/36 |
| 6,480,169 B2 * | 11/2002 | Fowler | 343/806 |
| 6,683,254 B1 * | 1/2004 | Gunnels | 174/84 R |
| 6,686,538 B2 * | 2/2004 | Yamamoto | 174/36 |
| 7,126,055 B1 | 10/2006 | Low et al. | |
| 7,301,424 B2 * | 11/2007 | Suarez-Gartner et al. | 333/239 |
| 7,314,997 B1 * | 1/2008 | Mui | 174/28 |
| 7,397,645 B2 * | 7/2008 | Chou | 361/111 |
| 7,446,258 B1 * | 11/2008 | Sosna et al. | 174/33 |
| 7,834,270 B2 * | 11/2010 | Zhu et al. | 174/105 R |

(Continued)

*Primary Examiner* — William H Mayo, III

(74) *Attorney, Agent, or Firm* — Craig M. Stainbrook; Stainbrook & Stainbrook, LLP

(57) ABSTRACT

A method and apparatus for reducing dielectric polarization and dielectric relaxation within a signal wire by partially neutralizing the electric charge differential within the dielectric material between the signal conductor and the surrounding insulating dielectric material.

18 Claims, 14 Drawing Sheets

(56) References Cited

U.S. PATENT DOCUMENTS

| | | | |
|---|---|---|---|
| 8,674,225 B2 * | 3/2014 | Horan et al. | 174/74 R |
| 8,674,226 B2 * | 3/2014 | Horan et al. | 174/74 R |
| 8,680,395 B2 * | 3/2014 | Horan et al. | 174/74 R |
| 2013/0056265 A1 * | 3/2013 | Khotenko | 174/70 R |

* cited by examiner

METHOD TO REDUCE SIGNAL DISTORTION CAUSED BY DIELECTRIC MATERIALS IN TRANSMISSION WIRES AND CABLES

CROSS REFERENCES TO RELATED APPLICATIONS

The present application claims the benefit of U.S. Provisional Patent Application Ser. No. 61/388,539, filed Sep. 30, 2010 (Sep. 30, 2010.)

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE

Publications and patent applications mentioned in this specification are herein incorporated by reference to the same extent as if each individual publication or patent application was specifically and individually indicated to be incorporated by reference.

BACKGROUND OF THE INVENTION

1. Field of the Invention

The invention relates generally to consumer electronics, and more particularly to high-end home entertainment systems and systems used in the recording and mastering industry, and still more particularly to a method and apparatus for improving the performance of interconnecting cables used between recording or playback audio and video components by reducing signal distortion caused by dielectric materials in the wires and cables.

2. Discussion of Background Art

U.S. Pat. No. 7,126,055 to Low et al ("Low '055") teaches a method to apply a bias voltage to the dielectric of a cable without interfering with the signal. An energy source is required and must be applied to at least one conductor that is not in the signal path. The purpose of the invention, as stated, is to create a static bias voltage upon the dielectric material. This bias voltage is provided by a battery or possibly a power supply that would be used to generate an equivalent DC voltage potential.

U.S. Pat. No. 5,307,416 to Martin ("Martin '416") teaches an apparatus and circuit that biases a cable to a biased voltage. Martin places a bias voltage upon the signal conductor itself, in effect placing a DC voltage bias upon the conductor and then modulating the DC voltage with the signal. This requires complex circuitry to create the DC voltage and circuitry to prevent the DC voltage from interacting with the electronic devices to which the cable is attached. As with Low '055, Martin '416 does not prevent dielectric polarization, nor does it claim to do so.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention is a method and apparatus that improves the performance of interconnecting cables used between recording and/or playback audio and video components. These cables may include but are not limited to RCA interconnects, XLR interconnects, speaker cables, AES/EBU digital cables, AC mains power cables, guitar cables, microphone cables, and the like. The electrical components (devices) that these cables are used to interconnect may include, but are not limited to: CD players, amplifiers, preamplifiers, DACs, microphones, speakers, tape recorders, and the like.

Although designed for audio and recording cables, the present invention may also have application in high speed digital signal transmission since implementation of the invention can significantly increase the useful length of copper conductor based cables. Digital signal transmission at gigabit speeds and beyond severely limits the practical maximum length of interconnecting transmission cables. The present invention significantly increases maximum cable lengths and increases digital signal integrity and reliability.

The present invention is adapted for use with wires used to transmit an alternating electromagnetic signal. Dielectric material is commonly used to insulate the wires. Examples of dielectric materials that may be used to insulate wires include but are not limited to the following plastics and rubbers: polyethylene, thermoplastic, polyvinyl chloride, rubber, nylon, Teflon etc.

An electrical current that propagates through a wire, generates a corresponding electromagnetic field that surrounds and interpenetrates the conductor. The electromagnetic field is composed of two fields: the electric field (E-field) and the magnetic field (H-field). Dielectric materials react to electric fields but do not react to the magnetic field. Dielectric materials demonstrate an effect called dielectric polarization and dielectric relaxation. In essence, a dielectric may store and release electric field energy when exposed to an alternating electric field.

The present invention significantly reduces or entirely eliminates the charge and discharge of the dielectric material. This contrasts with Low '055, discussed in the background, above, which attempts to charge or bias the dielectric to a static voltage level. Biasing a dielectric to a static level cannot prevent dielectric polarization and re-radiating as described by the present invention. Further, the present invention tracks the signal and dynamically adjusts the electric level applied to the dielectric in such a way as to neutralize dielectric polarization, while Low simply applies a fixed bias level. Further, Low does not require that each signal conductor have a corresponding surround conductor. Without a surround conductor around a center conductor it is impossible to evenly distribute an electric charge so as to eliminate the dielectric polarization of the dielectric as described in the present invention. In Low '055, a bias is applied to both the positive signal wires and to the return path negative wires. This would also preclude the possibility of neutralizing the dielectric charge upon each individual signal wire.

Low '055 requires a battery or other external voltage supply for its operation. The present invention requires no external voltage supply or battery and acquires its dynamically varying electric field from the signal itself.

Martin '416, also discussed in the background, above, does not require a dual conductor wire or electric field compensation circuit that would prevent dielectric polarization as does the present invention. The present invention does not require a DC voltage or complex circuitry and does not pre-bias the conductor and or dielectric as does Martin '416.

The foregoing summary broadly sets out the more important features of the present invention, as well as those that distinguish it from known prior art, so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
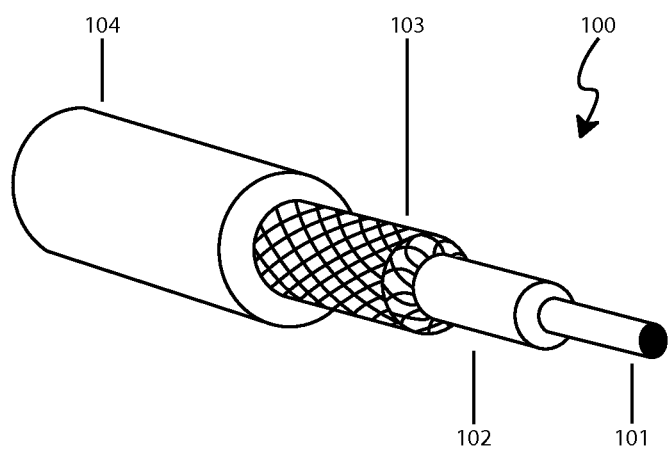
FIG. 1 is an upper perspective view showing a dual conductor wire with conductor and dielectric layers sectioned.

As used herein, the term "wire" describes a wire 100 composed of two conductors, such that both conductors carry the transmission signal, as illustrated in FIG. 1. This figure shows that a first conductor 101 is a primary, center conductor insulated with a standard dielectric material 102. The second conductor 103 surrounds and is coaxial with the center conductor 101 and is essentially cylindrical in cross-section. The second conductor may be protected by a jacket or insulation 104. This type of wire is similar in construction to conventional coaxial cable; however, in the context of the present invention, and as used in this disclosure, it is not used in a manner typical of the ways in which coaxial cable is used.

FIGS. 2-12b show the inventive method and apparatus to reduce signal distortion caused by dielectric materials in transmission wires and cables.

Figure 2:
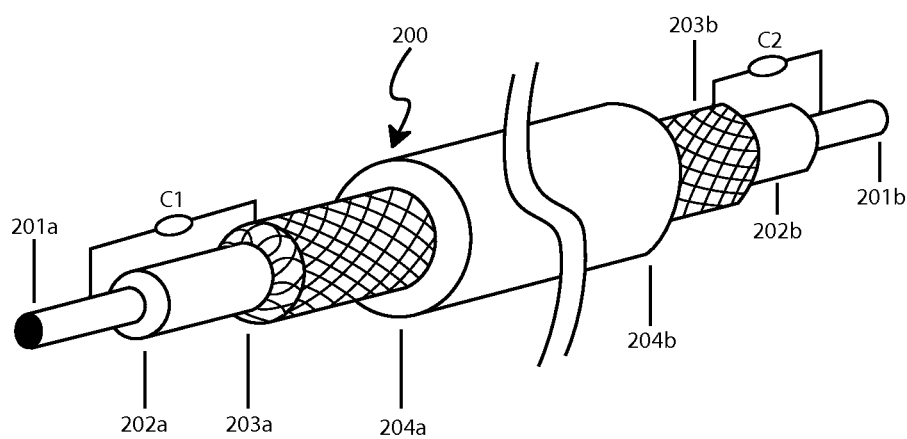
FIG. 2 is an upper perspective view showing the EFC wire of the present invention.

Referring first to FIG. 2, there is shown a preferred embodiment of the present invention, which includes a wire with two conductors and an electric field compensation circuit. The invention is therefore summarily referred to herein by its initials as an "EFC wire." It includes a dual conductor wire and the electrical field compensation circuit, wherein element 201a is a source end center conductor, 202a and 202b are each ends of a center conductor insulation, 203a is the source secondary conductor, 204a and 204b are exposed ends of the wire jacket insulation, and 203b is the destination end secondary conductor. A destination end center conductor is shown as element 201b. A first capacitor, C1, connects the source end center conductor 201a to the source end surround conductor 203a. Second capacitor, C2, connects the destination end surround conductor 203b to the destination end center conductor 201b. Capacitors C1 and C2 represent the electrical field compensation circuit.

As will be appreciated, the EFC wire must include the two conductors, with the first, center conductor (201a and 201b) and the second surround conductor (203a and 203b). The electric field compensation circuit is provided by at least two capacitors, first capacitor C1 and second capacitor C2, the first, C1, connected at the source end 201a (beginning) of the signal wire. One side of the first capacitor is connected to the primary conductor 201a while the other side is connected to the second conductor 203a. First capacitor C1 is in series with the second conductor. Second capacitor C2 connects at the destination end of the signal wire. As with the first capacitor, it is connected in series with the second conductor 203b and attached to the center conductor 201b. The two conductors establish two parallel and coincident signal paths within the wire. The center, primary conductor acts similarly to a conventional wire by providing a signal transmission path and current path. The second conductor is not intended to carry current, but rather is charged by the electric field from the source signal. Additionally, the series capacitors prevent significant current flow through the second, surrounding conductor.

In an alternate embodiment, the electric field compensation circuit may comprise a network of capacitors and resistors so as to achieve the same desired result of minimal current flow within the second surround conductor and a predominance of E-field field strength within the surround conductor so as to counter the E-field generated by the center conductor.

In yet an another embodiment, the electric field compensation circuit can include an active circuit comprising a small amplifier designed to deliver an electric field to the surround conductor that is designed to counter the E-field generated by the center conductor. The amplifier can be very small because it need not supply any significant amount of current. It must only supply a dynamically varying electric charge that tracks and is in phase with the input signal, and which is sufficient to counter the varying E-field generated by the center conductor. The amplifier is tailored to deliver minimal current flow within the second surround conductor and a predominance of E-field field strength within the surround conductor so as to counter the E-field generated by the center conductor.

Figure 3:
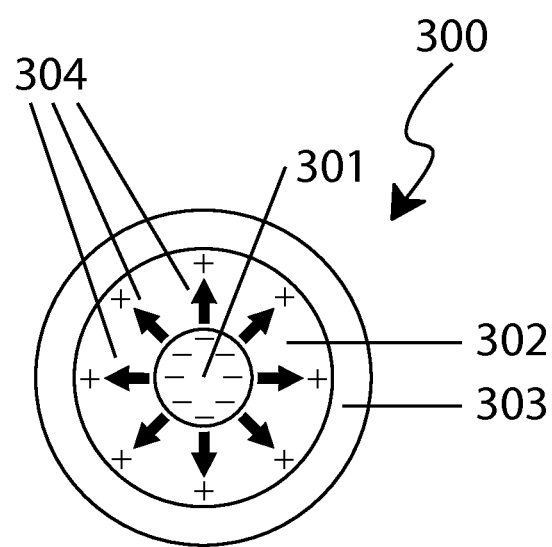
FIG. 3 is a schematic end view in elevation showing the dielectric polarization.

Referring next to FIG. 3, there is illustrated a cross-sectional view of the dual conductor wire 300 as used in the present invention. The primary center conductor 301 is surrounded by center conductor insulation 302, provided by dielectric material surrounding the center conductor. The second surround conductor 303 is a conductive shield disposed around center conductor insulation. The arrows 304 with positive and negative charge indicators at their ends represent the molecular polarity orientation that indicates a dielectric polarization. In this view, for simplicity the jacketing insulation layer, which would normally insulate the shield, is not shown. When a signal is transmitted through the wire, it generates an electric field around the conductor 301 as represented by the arrows. The electric field from the conductor causes a polar movement of the molecules within the dielectric as represented by the positive and negative symbols. The dielectric 302 stores an electric charge by way of this molecular polarization. When the signal is removed or changes direction, the electric charge reverses and the stored charge within the dielectric is released. The electric field generated by the dielectric induces a current within the conductor 301, which distorts the original intended signal.

Figure 4:
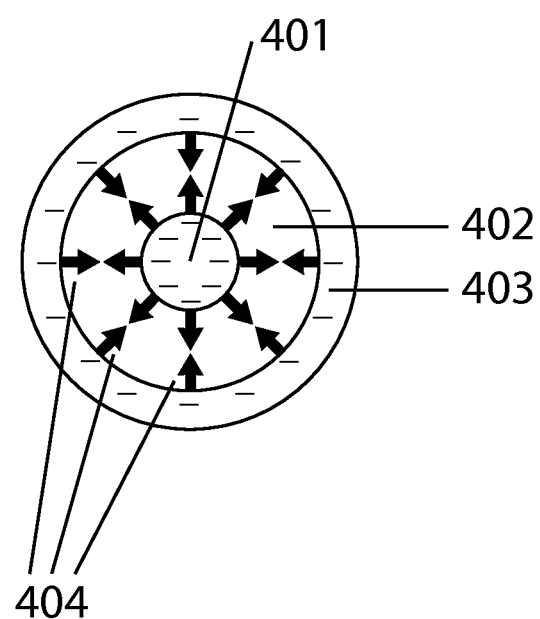
FIG. 4 is a schematic end view in elevation showing the dielectric polarization neutralized.

Referring now to FIG. 4, there is shown in an elevational schematic end view the dielectric polarization neutralized. In this view, primary center conductor 401 is insulated by center conductor insulation 402, and 403 is the second surround conductor. The center conductor 401 has a relative negative electrical charge while the second conductor 403 imposes an opposing negative electrical charge. The arrows 404 in the dielectric material 402 illustrate an off-setting net neutral electrical charge within the dielectric.

Figure 5:
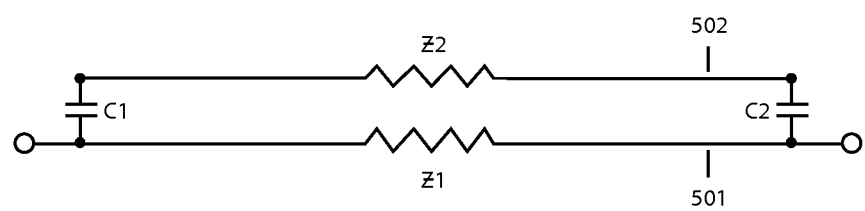
FIG. 5 is a schematic circuit diagram showing of the ECF wire of FIG. 2.

FIG. 5 is an electrical schematic diagram showing the electrical circuit of the preferred embodiment illustrated in FIG. 2. In this view, element 501 is the primary center conductor, and second surround conductor 502. Capacitor C1 is the source end capacitor connecting the source primary conductor to the source second conductor. Capacitor C2 is the destination end capacitor connecting the destination end primary conductor to the destination second conductor. Impedance Z1 is the impedance of the primary conductor, including its resistance and inductance. Impedance Z2 is the impedance of the secondary conductor including its resistance and inductance. It does not represent or include the impedance imposed by capacitors C1 and C2 to the circuit. In most cases the impedance of Z1 and Z2 will be very nearly equal.

Capacitors C1 and C2 together with the surround conductor 502 form a parallel signal path to the center conductor 501. This creates a current divider network because the impedance Z1 of the conductor 501 will create a voltage drop across the length of the wire. This in turn creates an identical voltage drop across the secondary signal path composed of C1, C2 and 502.

Although FIG. 5 is an equivalent electric diagram of FIG. 2, it cannot accurately illustrate the importance that surrounding conductor 502 completely and substantially evenly surrounds the center conductor 501 and that it is coincident to the center conductor. This is necessary to ensure that the electric field is evenly distributed through the dielectric insulation in such a manner so as to counter the electric field of the center conductor.

Figure 6:
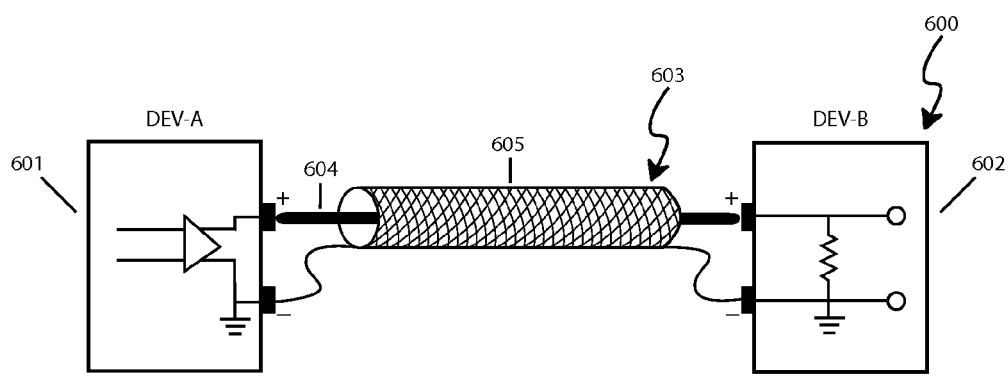
FIG. 6 is a schematic diagram showing a coaxial cable.

FIG. 6 is a schematic diagram 600 illustrating how a traditional coaxial cable is commonly used and terminated. The devices DEV-A 601 and DEV-B 602 represent two electrical devices that have a signal connection through the coaxial cable 603. Only the center conductor 604 and the shield conductor 605 are represented, not the insulation layers. The coaxial cable illustrated in FIG. 6 does include two conductors. The center conductor 601 provides the positive signal connection while the surrounding shield 602 is used as the negative connection and provides a return current path. Together, the center conductor and shield provides a completed circuit path for the signal transmission. FIG. 6 thus illustrates the typical manner in which a coaxial cable would be connected to transmit a signal from a first electronic device DEV-A 601 to a second electronic device DEV-B 602. DEV-A represents an electronic component with a simple output amplifier circuit. DEV-B represents a second electronic component receiving the signal transmission from DEV-A. Center conductor 601 is connected to the positive signal terminal while the shield 602 is connected to the negative signal terminal. Note should be made that only a single coaxial wire is necessary to complete a signal path between the two devices.

Figure 7:
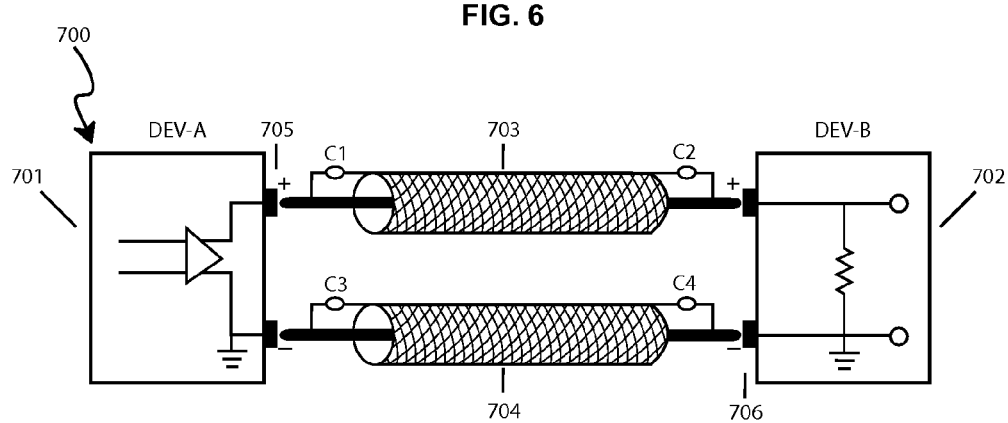
FIG. 7 is a schematic diagram showing the EFC cable of the present invention.

FIG. 7 is a schematic diagram 700 showing that two wires are required to make a complete circuit using EFC wire connecting two electrical devices 701, 702. A first EFC wire 703 connects to the positive terminal 705 of DEV-A 701. A second EFC wire 704 connects to the negative terminal 706 of DEV-B 702, thereby making a complete signal path between DEV-A and DEV-B. Capacitors C1 and C2 represent the electrical field compensation circuit for EFC wire 703. Capacitors C3 and C4 represent the electrical field compensation circuit for the second EFC wire 704. In contrast to a coaxial type connection, using the invention to complete a transmission circuit path, it is necessary to use two EFC wires. Note should be made that in the schematic of FIG. 7, each of the two EFC wires include two conductors and an electric compensation circuit for each EFC wire, represented by capacitors C1, C2, and C3, C4, respectively. EFC wire 703 connects to the positive signal terminal while the second EFC wire 704 is connected to the negative signal terminal and provides the return current path. The EFC wires, 703 and 704, form a complete signal path between DEV-A and DEV-B.

In a typical coaxial cable connection, the surround conductor is conventionally used as an RFI/EMI shield by connecting it to a ground pin, a ground wire, or a grounding surface. However, in the EFC wire of the present invention, the second surround conductor is never used as a shield, as a grounding wire, or as a grounding surface, nor is it ever connected to any other conductive surface. Further, in the present invention, the surround conductor is never used to complete a current path with the primary conductor. Instead, the center conductor and the surround conductor are always operated in parallel and in unison to the signal path. This requires the use of a separate wire to complete a signal path, as illustrated in FIG. 7.

Figure 8:
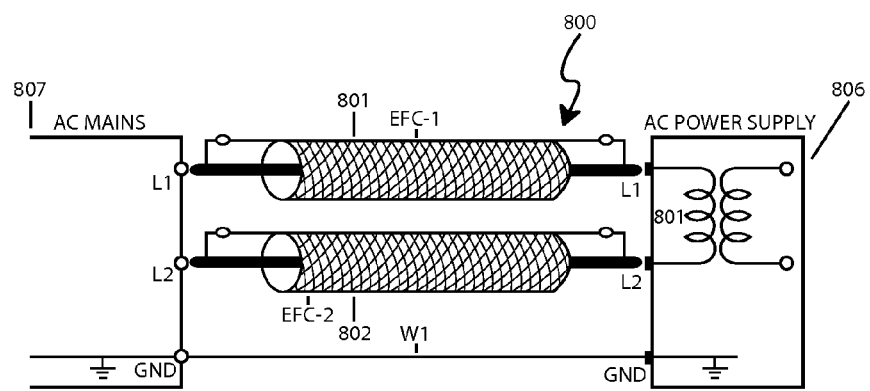
FIG. 8 is a schematic diagram showing an AC power cable.

FIG. 8 shows that the EFC wire of the present invention may be used within an AC mains power cable as a power cord connection 800. This cable is commonly used to connect an electronic component power supply 806 to an AC wall outlet 807. First EFC wire, EFC-1, 801, is the electrically charged "hot wire" (L1) within the power cable that provides power to the load. Second EFC wire, EFC-2, 802, is the neutral wire or current return (L2) within the power cable. Common type wire W1 is used for the safety ground connection.

In most countries, a power cable includes three wires within a typical power cable. The individual wires include a hot wire and a current return path wire (i.e., a neutral wire). In some countries the hot wire and the neutral wire are both AC voltage wires. A third wire is a safety ground wire. For the embodiment shown in FIG. 8, it is preferable that both current carrying wires, 801, 802, utilize an EFC wire.

In another embodiment variation, L1 can utilize an EFC wire and L2 can utilize a common wire type. In such a configuration, however, there would be significant performance loss because the signal distortion reduction method provided by the present invention would be applied to only half of the current path.

Digital cables may use a minimum of two wires (or more) and commonly use RCA, XLR and BNC style connectors. Regardless of the type of connector used, it is preferable that wires carrying the digital signal use an EFC wire. In a digital cable embodiment it is important to select proper values for the capacitors in the electric field compensation circuit. Since digital signals are commonly much higher in frequency than audio band signals, the value or values of the capacitors must be much smaller. Testing may be required to optimize the values depending upon the fundamental frequency of the digital transmission, but in general the recommended ratios range between 50-80:1.

Figure 9:
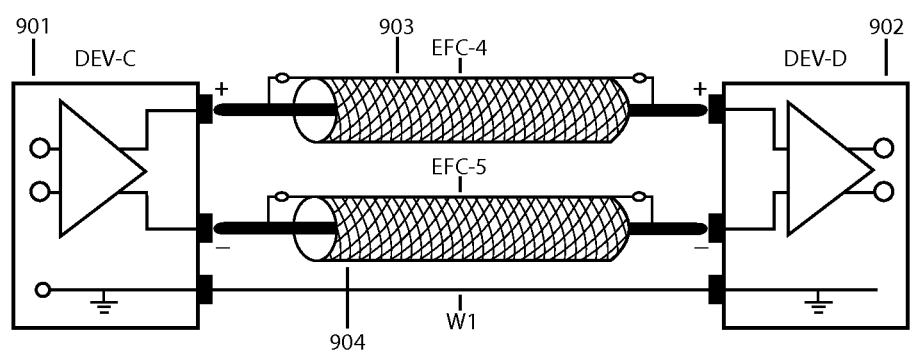
FIG. 9 is a schematic diagram showing a balanced analog audio transmission.

FIG. 9 is a schematic diagram illustrating an example of a balanced interface connection 900 using the EFC wire of the present invention. A first electronic device DEV-C 901 is the signal source electronic component and second electronic device DEV-D 902 is the destination component. A first EFC, namely, EFC-4 903 represents the positive (S1) wire within the cable, while a second EFC, EFC-5 904 represents the return (S2) or negative wire within the cable. Common type wire W1 connects to the ground pins. EFC-4 903 and EFC-5 904 constitute a complete signal path between DEV-A 901 and DEV-B 902. W1 is a common type wire and is a ground connection between the devices and does not carry any signal information.

As may be appreciated, the present invention may be used in a speaker cable in which an EFC wire would be used for both the positive and negative wires to connect an amplifier to one or more speakers.

Figure 10:
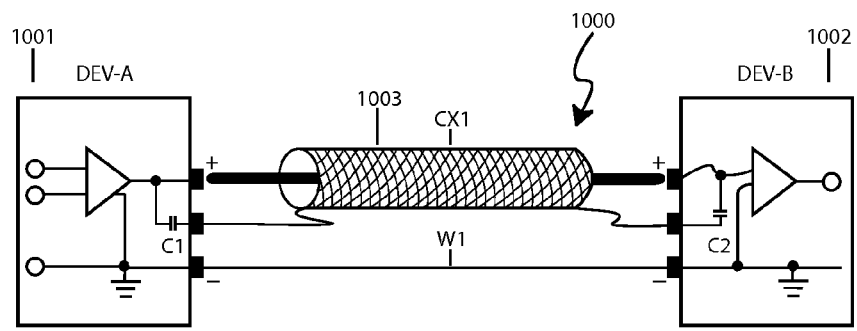
FIG. 10 is a schematic diagram illustrating the electric field compensation circuit built into the inventive apparatus.

FIG. 10 is a schematic diagram illustrating an alternate embodiment 1000 wherein the electric field compensation circuit is incorporated into one or more electronic devices 1001, 1002, rather than within a wire alone. Conductor CX1 1003 is the required dual conductor wire, and capacitor C1 is the electric field compensation circuit located within electronic device DEV-A 1001. Capacitor C2 is the corresponding electric field compensation circuit located within electronic device DEV-B 1002. Wire W1 is the common ground. In this embodiment, both electrical devices must be designed specifically to implement the present invention. This requires a two contact connector for each interface, and further requires an external electrical contact for the center wire and separate electrical contact for the second surround wire. In the view, for clarity only the positive conductor is represented with an EFC style interface. However, in a preferred embodiment, both the positive and the negative interface would be of an EFC type.

Further, in this embodiment, a BNC or RCA connector could be used, though in an unconventional manner. Both the BNC and the RCA are designed to provide a complete signal and current path conductor. In this embodiment, each connector and associated wire represents only a single wire and requires a second wire W1 to complete a signal or current path. Further, the BNC or RCA connectors on the electrical device cannot be connected to ground or the chassis, as is commonly done with these connector types. While the BNC and RCA connectors are used as examples, any suitable connector with two or more contacts can be used.

Figure 11:
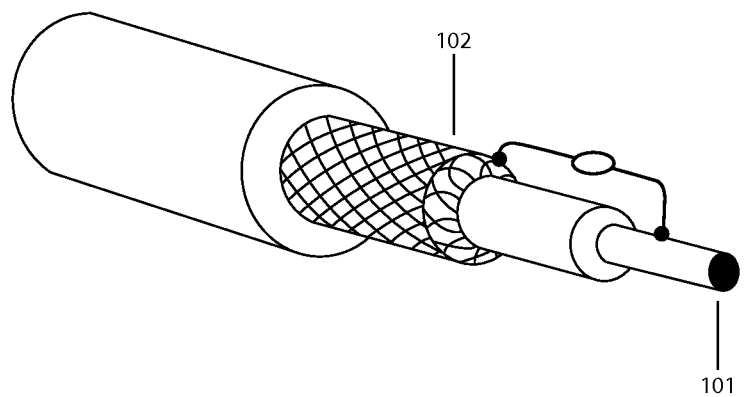
FIG. 11 is an upper partial cross-sectional perspective view showing the E-field and H-field conductors.

FIG. 11 shows a primary, center conductor 101, which carries a preponderance of the current and, therefore, the predominance of the magnetic field (or H-field). The secondary, surround conductor 102 carries the predominance of the electric field (or E-field) because the electric field compensation circuit ensures that there is virtually no current flow within the surround conductor. Both conductors are in the signal path, but because the surround conductor 102 predominates in the E-field, and surrounds and is coincident to the center 101 conductor, it tends to counter the E-field generated by the center conductor within the dielectric material.

Figure 12A:
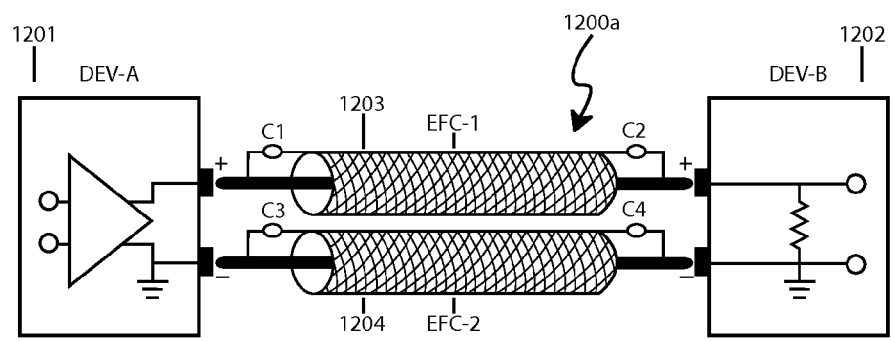
FIGS. 12a and 12b are schematic diagrams illustrating a single-ended transmission.
Figure 12B:
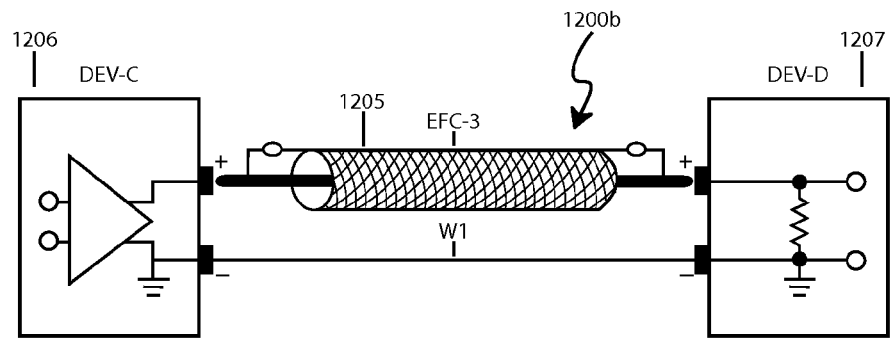

FIGS. 12*a* and 12*b* are schematic views showing a single-ended type interface connection using the invention. In FIG. 12*a*, first electronic device DEV-A 1201*a* is the signal source electronic component and second electronic device DEV-B 1202*a* is the destination component. First EFC wire EFC-1 1203 represents the positive wire within the cable, while second EFC wire, EFC-2, 1204, is the return, or negative wire within the cable. EFC-1 and EFC-2 constitute a complete signal path between DEV-A and DEV-B. This is an example of an audio, single-ended type interface using RCA type connectors.

FIG. 12*b* shows an alternate embodiment 1200*b* to FIG. 12*a* using only one EFC wire, EFC-3, 1205, for the positive wire. In FIG. 12*b*, DEV-C 1206 is the signal source electronic component and DEV-B 1207 is the destination component. EFC-3 represents the positive wire within the cable. W1 represents the negative wire within the cable. In this embodiment, illustrating an audio, single-ended connection between the two devices DEV-C and DEV-D, only one of the interconnecting wires uses the present invention. There will, therefore, be significant performance loss, since the signal return wire W1 is a common wire and not an EFC type.

Figure 13:
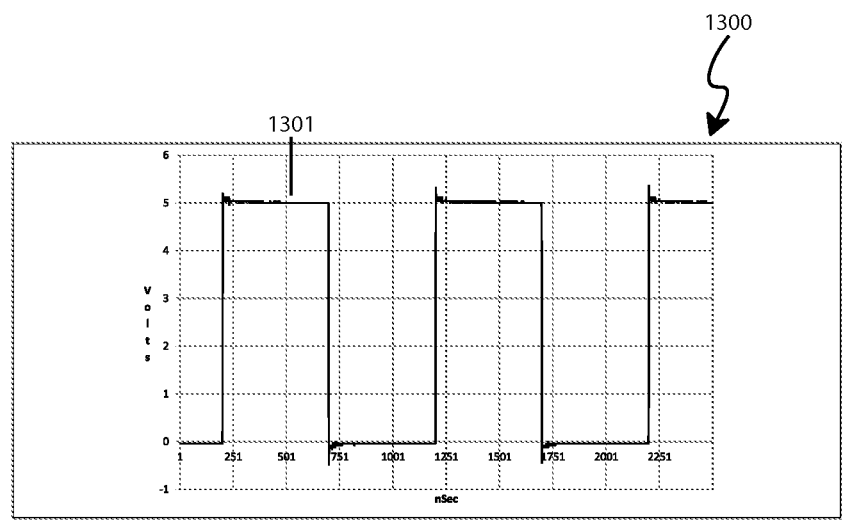
FIG. 13 is a graph showing a square wave input signal.

FIG. 13 is an oscilloscope screen capture 1300 showing the square wave signal 1301 as applied to the input of the EFC wire.

Figure 14A:
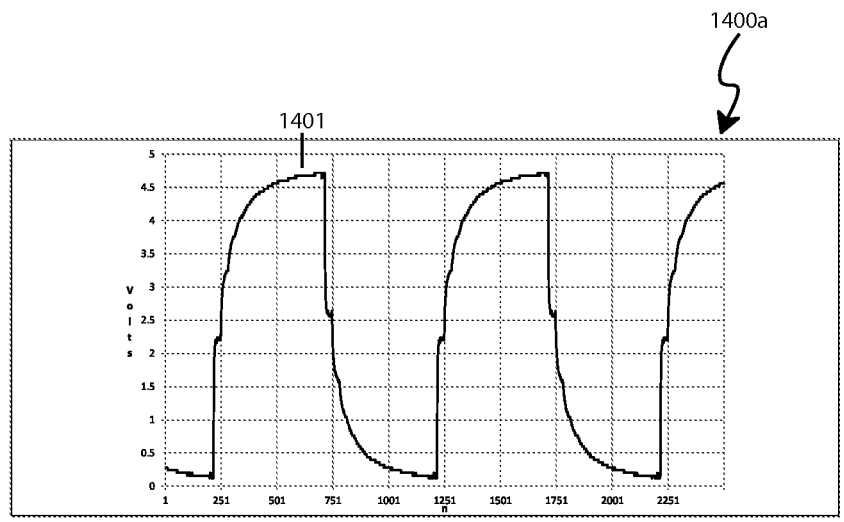
FIGS. 14a and 14b are graphs showing square wave output signals.
Figure 14B:
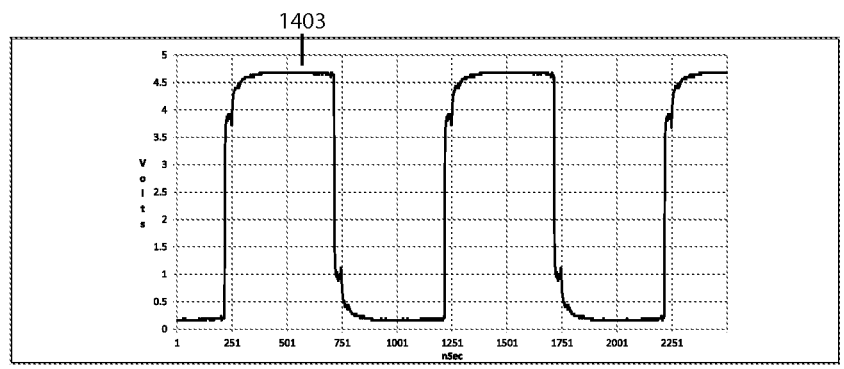

FIG. 14*a* is an oscilloscope screen capture 1400*a* showing the square wave signal 1401 as it appears at the output of a cable that does not utilize the inventive EFC elements, while FIG. 14*b* is an oscilloscope screen capture 1400*b* showing the square wave signal 1403 as it appears at the output of a cable using the inventive technology.

Figure 15:
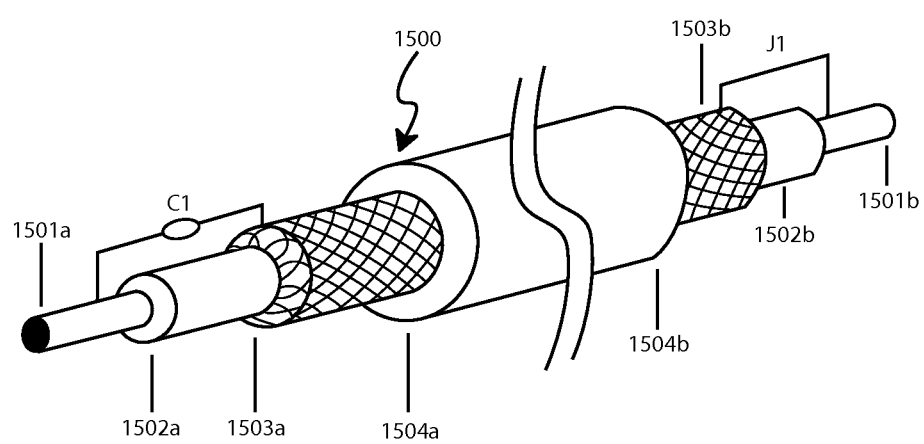
FIG. 15 is an upper perspective view of an alternative embodiment in which the electric field compensation circuit uses a single capacitor and a jumper wire.

FIG. 15 shows yet another embodiment of the EFC wire of the present invention. In this embodiment, the electrical field compensation circuit may include only a single capacitor. In this embodiment, the elements are generally identical to those of the embodiment shown in FIG. 2, and corresponding reference numbering is therefore retained. Specifically, it includes a dual conductor wire and the electrical field compensation circuit, wherein element 1501*a* is a source end center conductor, 1502*a* and 1502*b* are each ends of a center conductor insulation, 1503*a* is the source secondary conductor, 1504*a* and 1504*b* are exposed ends of the wire jacket insulation, and 1503*b* is the destination end secondary conductor. A destination end center conductor is shown as element 1501*b*. A first capacitor, C1, connects the source end center conductor 1501*a* to the source end surround conductor 1503*a*. However, in this instance, the second capacitor is replaced by a simple jumper wire J1 connecting the destination end surround conductor 1503*b* to the destination end center conductor 1501*b*. First capacitor C1 prevents significant current flow through the surround conductor, satisfying the requirement of a preponderance of E-field energy in the surround conductor. To complete a signal path through the outer conductor, the simple wire jumper J1 is used to complete a connection between 1503*b* and 1501*b*, instead a second capacitor as used in the preferred embodiment. This embodiment uses fewer parts and is less costly to produce than the embodiment shown in FIG. 2. However there may be a reduction in performance due to the possibility of signal reflections or eddy currents through J1.

The electric field compensation circuit used in the present invention is a circuit designed to minimize current flow through the second, surround conductor while imposing and maximizing an electric field charge upon the surround conductor that tracks the source signal and dynamically counters the E-field as radiated into the dielectric material by the center conductor. The selection of the values of the capacitors is critical to the effectiveness of the invention. To achieve the desired result, the values of the two capacitors must be chosen carefully. Since the impedance of a capacitor is dependent upon the transmission frequency, the value of the capacitors will be dependent upon the frequency or spectrum of frequencies that the signal wire will be used for.

Since the primary center conductor is responsible for carrying the current load, it should have a very low impedance. The second conductor must have as little current flow as possible, therefore the conductor should have a relatively high impedance to the signal. To accomplish this, the second conductor has two capacitors in series, one each at the corresponding source and destination of the wire. This eliminates any possible DC current flow through the second conductor and will tend to substantially increase the impedance of the second conductor, depending upon the frequency of transmission and of the value of the capacitor. The results of many experiments and tests indicate that the ideal value for the capacitors creates an impedance differential between the primary and secondary conductors in the ratio of approximately 50-80:1. Stated another way, the second conductor should have 50-80 times the impedance of the primary center conductor at the desired frequencies of signal transmission. If the value selection for the capacitor is too low, then the magnitude of the E-field within the second conductor will be too small to achieve the desired counter dielectric polarization effect. If the value selected for the capacitor is too high then there will be increased current flow in the second conductor which will negate the desired effect of a predominance of E-field within the conductor. Essentially, the second conductor simply becomes another current path for the signal and the desired effect will not be realized.

Characteristic Impedance Tests: The application of the invention to a cable dramatically reduces the characteristic impedance of the cable. A 30 meter twisted pair wire has been tested using the present invention. Data are presented for two tests. In the first test, a conventional cable (not employing the present invention) was tested to establish baseline readings for the type of wire used. In a second test, an identical type of cable was tested, except that this cable included the electrical field compensation circuit of the present invention.

Test equipment included a signal generator and a high bandwidth oscilloscope. A custom designed output buffer connected the signal generator and the CUT (cable under test).

The output buffer provided a high current output with fast transient response to ensure that the low impedance of the cable did not significantly load the signal generator, which might have skewed measurements. The CUT was terminated into a custom designed termination pad adjustable from zero to 600 ohms.

FIG. 12a shows the test setup in which DEV-A 1201 was the generator and buffer. The CUT cable is represented by EFC-1 1203 and EFC-2 1204. The custom terminated load is represented by DEV-B 1202.

A 20 kHz pulse was applied to the input of the CUT. The oscilloscope monitored the input to the cable. The cable generated a reflection from the end of the cable visible on the oscilloscope. This is similar to a time domain reflectometer measurement and indicates that the impedance of the cable and the termination impedance were not the same. The custom termination pad was adjusted until the reflection was reduced to a minimum, indicating that the impedance of cable and resistance of the termination pad were identical. Then, the resistance of the termination pad was measured to determine the corresponding characteristic impedance of the CUT.

Test 1: The CUT was a dual conductor type of the kind used in the present invention, however with the electric field compensation circuit removed. There was no connection to the surround conductor at either the input or output of the cable. (An equivalent cable diagram is illustrated in FIG. 12a, except that C1, C2, C3 and C4 have been removed.) The cable was 30 meters in length.

Test 1 Result: The equivalent characteristic impedance measured 68.0 ohms.

Test 2: The CUT was an EFC type as described in the invention with the inclusion the electric field compensation circuit. An equivalent cable diagram is illustrated in FIG. 12a which is composed of EFC-1 and EFC-2 with C1, C2, C3 and C4 connected. The cable length of 30 meters was the same as in Test 1.

Test 2 Result: The equivalent characteristic impedance measured 31.6 ohms.

These tests clearly demonstrate that the present invention significantly reduces the characteristic impedance of a cable. The characteristic impedance of the CUT in Test 2 was reduced by more than 50% compared to the baseline CUT in test one.

Square-wave Response Test: A square-wave response test is commonly used to test audio equipment to test phase linearity and high frequency bandwidth. The test reliably demonstrates the storage and re-radiation of electromagnetic fields within a device, circuit or cable.

The test equipment used in this test was the same as that used in the characteristic impedance test. The test setup was also identical. The custom designed output buffer was set to one ohm output impedance and the custom designed termination pad was set to 25 ohms. This was not changed or adjusted for the duration of the following two tests.

Test procedure. A 100 kHz square wave was applied to the input of the CUT. The oscilloscope monitored the input of the CUT on channel one and the output of the cable on channel two. FIG. 13 is a scope screen capture of the square wave applied to the input of the CUT.

Test 3: The CUT was a dual conductor type as used for the invention, with the electric field compensation circuit has been removed. There was no connection to the surround conductor at either the input or output of the cable. An equivalent cable diagram is illustrated in FIG. 12a, except that C1, C2, C3 and C4 have been removed. The cable was 30 meters in length.

Test 3 Result: The results of this test are shown in the oscilloscope screen capture shown in FIG. 14a.

Test 4: The CUT was an EFC type as described above with the inclusion of the electric field compensation circuit. An equivalent cable diagram is illustrated in FIG. 12a, which comprises first and second EFC wires, EFC-1 and EFC-2, with capacitors, C1, C2, C3 and C4 connected. The cable length of 30 meters was the same as in Test 1.

Test 4: Results of this test are shown in the oscilloscope screen capture of FIG. 14b.

The results of the square wave response test clearly indicate that the cable in Test 3 absorbed significant amounts of high frequency energy. This is indicated by the significant rounding off of the rise and fall of the transients of the square waves. By comparison, the CUT in Test 4, which uses the invention, has faster rise and fall times and the output square wave more approximates the input waveform at the input of the cable.

While the particular EFC wire and circuit configuration herein shown and disclosed in detail is fully capable of attaining the objects and providing the advantages stated herein, it is to be understood that it is merely illustrative of the presently preferred embodiment of the invention and that no limitations are intended to the detail of construction or design herein shown other than as defined in the appended claims. Accordingly, the proper scope of the present invention should be determined only by the broadest interpretation of the appended claims so as to encompass all such modifications as well as all relationships equivalent to those illustrated in the drawings and described in the specification.

As for additional details pertinent to the present invention, materials and manufacturing techniques may be employed as within the level of those with skill in the relevant art. The same may hold true with respect to method-based aspects of the invention, particularly with respect to additional or alternative acts commonly or logically employed. Also, it is contemplated that any optional feature of the inventive variations described may be set forth and claimed independently, or in combination with any one or more of the features described herein. Reference to a singular item, includes the possibility that there are plural of the same items present. Thus, as used herein and in the appended claims, the singular forms "a," and, "said," and "the" include plural referents, unless context clearly dictates otherwise. Further, the claims may be drafted to exclude any optional element. As such, this statement is intended to serve as antecedent basis for use of such exclusive terminology as "solely," "only," and the like, in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed as invention is:

1. An electric field compensation wire configured to improve the performance of signal transmission cables and interconnecting cables used between recording and/or playback audio and video components, comprising:
    a center conductor having a center conductor source end and a center conductor destination end, said center conductor providing a first signal path for carrying a first signal;
    a layer of center conductor insulation axially disposed around said center conductor;
    a surround conductor axially disposed around said center conductor insulation and having a surround conductor source end and a surround conductor destination end, said surround conductor providing a second signal path for carrying a second signal in the same direction as said first signal carried on said first signal path;
    wire jacket insulation axially disposed around said surround conductor; and
    an electric field compensation circuit that splits an input signal into said first and second signals for transmission in the same direction along said first signal path and said second signal path.

2. The electric field compensation wire of claim 1, wherein said electric field compensation circuit includes a first capacitor connecting said center conductor source end to said surround conductor source end, and a second capacitor connecting said surround conductor destination end to said center conductor destination end.

3. The electric field compensation wire of claim 2, wherein said first capacitor is connected in series with said second capacitor.

4. The electric field compensation wire of claim 1, wherein said electric field compensation circuit includes at least a first capacitor connecting said center conductor source end to said surround conductor source, and a second capacitor connecting said center conductor destination end to said surround conductor destination end, and wherein said first and second conductors establish two parallel and coincident signal paths within said wire.

5. The electric field compensation wire of claim 1, wherein said center conductor provides a signal transmission path and current path, and said second conductor does not carry current but is charged by the electric field from a source signal.

6. The electric field compensation wire of claim 1, wherein electric field compensation circuit prevents significant current flow through said surround conductor.

7. The electric field compensation wire of claim 1, wherein said electric field compensation circuit comprises a network of capacitors and resistors configured so as to minimize current in said surround conductor and such that said surround conductor has a predominance of E-field field strength to counter the E-field generated by said center conductor.

8. The electric field compensation wire of claim 1, wherein said electric field compensation circuit includes an active circuit comprising an amplifier that delivers an electric field to said surround conductor so as to counter the E-field generated by said center conductor.

9. The electric field compensation wire of claim 8, wherein said amplifier supplies to said surround conductor a dynamically varying electric charge that tracks and is in phase with the input signal to said wire, which is sufficient to counter the varying E-field generated by said center conductor.

10. The electric field compensation wire of claim 1, wherein said electric field compensation circuit includes a first capacitor coupling said center conduct source end to said surround conductor source and a second capacitor coupling said center conductor destination end to said surround conductor destination end to form a current divider path and a parallel signal path to said center conductor.

11. The electric field compensation wire of claim 1, wherein said surround conductor substantially completely and substantially evenly surrounds said center conductor and is substantially coincident to said center conductor.

12. The electric field compensation wire of claim 11, wherein said surround conductor is evenly distributed around said center conductor so as to evenly distribute the electric field through said center conductor insulation to counter the electric field of the center conductor.

13. The electric field compensation wire of claim 1, wherein said electric field compensation circuit includes a first capacitor and a second capacitor, wherein the center conductor source end and said surround conductor source end are each connected to said first capacitor; and said center conductor destination end and said surround conductor destination end are each connected to said second capacitor.

14. A method to reduce signal distortion caused by dielectric materials in transmission wires and cables, the method comprising the steps of:
    providing an electric field compensation ("EFC") wire having a center conductor with a center conductor source end and a center conductor destination end, a layer of center conductor insulation axially disposed around the center conductor, a surround conductor axially disposed around the center conductor insulation and having a source conductor source end and a source conductor destination end, wire jacket insulation axially disposed around the surround conductor, and an electric field compensation circuit;
    providing a first electronic component having a positive terminal and a negative terminal;

providing a second electronic component having a positive terminal and a negative terminal;

connecting the source end of the center conductor and the source end of the surround conductor of the EFC wire to the positive terminal of the first electronic component;

connecting the destination end of the center conductor and the destination end of the surround conductor of the EFC wire to the positive terminal of the second electronic component;

connecting a second conductor to the negative terminal of both the first and second electronic components to provide a return signal path;

wherein the EFC wire provides the positive signal connection and the second conductor provides the negative connection and a return signal path, and wherein together, the EFC wire and second conductor provide a completed circuit path for the signal transmission; and wherein the electric field compensation circuit splits an input signal into a first and a second signal for transmission in the same direction along a first signal path on said center conductor and a second signal path along the surround conductor.

15. The method of claim 14, wherein the first electronic component has a simple output amplifier circuit and the second electronic component receives the signal transmission from the first electronic component.

16. The method of claim 14, wherein the first electronic component is an AC wall outlet and the second electronic component is a power supply for an electronic device, and wherein the center conductor of the first EFC wire is an electrically charged wire providing power to the load in the electronic device and the second EFC wire is a neutral wire providing a current return, and further including the step of connecting a common type wire for a safety ground connection.

17. The method of claim 14, wherein the cable is a cable carrying a digital or analog signal, and the values of the capacitors in the EFC wire are selected in accordance with the fundamental frequency of the signal transmission such that there is an impedance differential between the center conductor and the surround conductor in a ratio of approximately 50-80:1.

18. The method of claim 14, wherein the first electronic component is a signal source component and the second electronic component is a destination component, and further including the step of connecting a common type wire to the ground pins of each of the first and second electronic components.

* * * * *